United States Patent [19]
Jorissen et al.

[11] Patent Number: 5,548,026
[45] Date of Patent: Aug. 20, 1996

[54] EPOXY COMPOUND BLEND WITH DI(AMINOALKYL)ETHER OF DIETHYLENE GLYCOL

[75] Inventors: Steven A. Jorissen, Vadnais Heights, Minn.; Gregory A. Ferguson, Warren; Krystyna Imirowicz, Troy, both of Mich.

[73] Assignee: H. B. Fuller Company, Vadnais Heights, Minn.

[21] Appl. No.: 462,141

[22] Filed: Jun. 5, 1995

Related U.S. Application Data

[63] Continuation of Ser. No. 146,971, Nov. 3, 1993, abandoned.

[51] Int. Cl.$^6$ ............................................. C08L 63/02
[52] U.S. Cl. ..................... 525/113; 525/423; 525/486; 525/524; 525/526
[58] Field of Search .................................... 525/113, 524, 525/423, 486, 526

[56] References Cited

U.S. PATENT DOCUMENTS

| | | | |
|---|---|---|---|
| 3,645,969 | 2/1972 | Harvey | 528/107 |
| 4,383,060 | 5/1983 | Dearlove et al. | 523/429 |
| 4,668,736 | 5/1987 | Robins et al. | 525/65 |
| 4,847,122 | 7/1989 | Goldberg et al. | 523/443 |
| 4,914,164 | 4/1990 | Gannon et al. | 525/523 |
| 4,933,392 | 6/1990 | Andrews et al. | 525/113 |
| 4,977,214 | 11/1990 | Bagga | 528/93 |
| 5,025,068 | 6/1991 | Garcia et al. | 525/524 |
| 5,030,698 | 7/1991 | Mulhaupt et al. | 525/423 |
| 5,030,710 | 7/1991 | Speranza et al. | 528/324 |
| 5,034,251 | 7/1991 | Read et al. | 428/34.9 |
| 5,053,476 | 10/1991 | Akutagawa et al. | 523/440 |
| 5,151,470 | 9/1992 | Sanders et al. | 525/407 |
| 5,171,769 | 12/1992 | Bull et al. | 528/107 |
| 5,308,895 | 5/1994 | Gan et al. | 528/091 |
| 5,317,067 | 5/1994 | Yagi et al. | 525/524 |
| 5,317,068 | 5/1994 | Watanabe et al. | 525/524 |

FOREIGN PATENT DOCUMENTS

| | | |
|---|---|---|
| 0488949 | 6/1992 | European Pat. Off. . |
| 63-227686 | 9/1988 | Japan . |
| 1-185351 | 7/1989 | Japan . |

OTHER PUBLICATIONS

Database WPI Derwent Publications Ltd., London, GB; AN 86-135562 & JP,A,61 073 734 (Toray Ind) 15 Apr. 1986.
Database WPI Derwent Publications Ltd., London, GB; AN 87-230862 & JP,A,62 153 373 (Mitsui Toatsu Chem) 8 Jul. 1987.

*Primary Examiner*—Robert E. Sellers
*Attorney, Agent, or Firm*—Merchant, Gould, Smith, Edell, Welter, & Schmidt

[57] ABSTRACT

This invention is a two-part induction-curable epoxy adhesive comprising a first part of a polyfunctional epoxy such as a sorbitol polyglycidyl ether, and a diepoxy compound such as a diepoxy bisphenol-A wherein a portion of the diepoxy compound may preferably comprise a glycol-based epoxy having an epoxy equivalent weight of at least about 250. The second part of the adhesive is a curing agent which preferably maybe a mixture of nitrogen-based compounds di(aminoalkyl)ether of diethylene glycol, and a toughening agent. The invention also comprises a method of adjoining two substrates by applying the adhesive composition of the invention and curing as well as the article resulting from this method.

10 Claims, No Drawings

EPOXY COMPOUND BLEND WITH DI(AMINOALKYL)ETHER OF DIETHYLENE GLYCOL

This is a file wrapper continuation of application Ser. No. 08/146,971, filed Nov. 3, 1993 now abandoned.

FIELD OF THE INVENTION

The invention relates generally to heat curable toughened epoxy resin compositions. More specifically, the invention relates to two-part, induction heat curable, toughened epoxy adhesive systems useful for structural bonding of vehicle components in industries such as the automotive industry.

BACKGROUND OF THE INVENTION

Adhesives are often used in the manufacture of various composite articles such as the component parts of automobiles, airplanes, and watercraft. Various adhesives are known for these purposes including, Robins et al., U.S. Pat. No. 4,668,736 which discloses an epoxy resin composition comprising a room temperature curable glycidyl ether epoxide group-containing material, an amino-terminated aliphatic polyether curing agent, a polymeric toughening agent, and a metal salt catalyst. Robins requires a specific catalyst to promote curing at commercially practicable rates with a limited open time.

Sanders et al., U.S. Pat. No. 5,151,470 discloses epoxide resins comprising aminocrotonates, useful as curing agents within the adhesive composition and which also provide flexibility to the cured bond. Read et al., U.S. Pat. No. 5,034,251 discloses a mixture of substantially solid particles of a first reactive component, which may include a polyfunctional epoxy, with separate substantially solid particles of at least a second reactive component and a water soluble polymeric binder having substantially no hydroxyl groups. However, Read et al. requires the use of a catalyst to promote accelerated cure and also require a water soluble polymeric binder.

Mülhaupt et al., U.S. Pat. No. 5,030,698 discloses heat curable compositions which may be a one-part adhesive system comprising an epoxy resin, a curing agent for the resin, a liquid copolymer based upon ethylenically unsaturated comonomers such as butadiene or acrylonitrile, and, a selected segmented copolymer of recurring soft segments containing polypropylene glycol units or polybutylene glycol units. Speranza et al., U.S. Patent No. 5,030,710 discloses Polyamide cured nylon-6 non-adhesive articles produced by a combination of one or more carboxylic acids combined with a glycol diamine such as triethylene or tetraethylene glycol diamines.

Dearlove et al., U.S. Pat. No. 4,383,060 discloses an epoxy adhesive useful for structurally bonding automotive body panels and in the manufacture of making these panels from sheet molding compound. The Dearlove et al. composition uses a monofunctional epoxy to provide flexibility to the adhesive bond once formed.

In the fabrication of various component parts, the manner in which the individual components are assembled must often be considered in view of the entire manufacturing process. For example, operational electrical and mechanical components must be affixed and held in place with mechanism which will effectively withstand the further processing subjected to the assembly such as a car. Further, the structural components such as body panels including joints, prelaminated multipiece panels, and flanges must all be attached keeping in mind that the final assembly may need to be heated in order to affix, prime, or paint a portion of the structure or the structure as a whole.

For example, induction curing of hem-flange joints is well-known assembly in the automotive industry. Generally, a "hem-flange" joint is an assembly or a manner in which two or more metal pieces are processed or otherwise bonded to make a joint. For example, when bonding two pieces of metal to make a hem-flange joint, one piece of metal is retained as a protruding or a projecting flange. The second piece of metal which may be incident to the first piece of metal at any number of angles. Generally the second piece of metal is bent or otherwise folded to form a pocket or "hem" which envelopes both sides of the metal flange. An adhesive is commonly inserted into the hem and sandwiches, surrounds or covers both sides of the flange as inserted into the hem and when subsequently cured, forms a bond.

One example of a hem flange joint may be found in the hood for the engine compartment of an automobile. Generally, for example, a metal hood piece will comprise a peripheral hem flange joint which serves to secure various composite layers to the underside of the hood. The joint must retain strength and flexibility to withstand the continual vibration, impact, and other severe environmental stresses, such as heat, to which vehicle components are subjected.

Along with other problems, the common use of metal lubricants, the temperature sensitivity of component parts, as well as the accessibility of these parts during processing, are among the factors which have presented problems in the formation of hem-flange joints.

Generally, one-part epoxies are used for such applications which can cure in about 5 seconds at temperatures in the range of approximately 375° to 425° F. However, as pressure to reduce vehicle weight has increased, thin gauge metals are being used more frequently. Thin gauge metals often warp at the higher temperatures needed to cure the single-phase standard induction cure epoxies.

Another type of adhesive often used in the assembly of operational and structural components of automobiles comprises a two-part room temperature curing acrylic epoxy adhesive. This adhesive cures in about 30–40 minutes at 70° F. but require significantly longer cure times at 40°–50° F. Further, this adhesive generally cannot be rapidly induction cured because of the high volatility of its acrylic components. As a result, any temperature fluctuation may create severe problems in manufacturing processes due to the temperature dependence of the cure mechanism in this adhesive composition. For example, bonding cold metal panels during the winter months may be a problem with the acrylic/epoxy adhesive.

As a result, there is a need for toughened epoxy adhesive with the physical properties necessary to create bonds of high structural integrity and attach operational and structural components in heavy assemblies such as automotive, aircraft, and water vehicle manufacture without the creation of defects in the assembly.

SUMMARY OF THE INVENTION

In accordance with a first aspect of the invention there is provided an adhesive composition comprising a polyfunctional epoxy compound comprising three or more epoxide groups, one or more diepoxy compounds, one or more curing agents, and a toughening agent. In accordance with a second aspect of the invention there is also provided an article comprising a substrate having the adhesive composition of the invention deposited thereon.

In accordance with a more preferred aspect of the invention there is provided a two-part induction-curable epoxy adhesive. The first part of the adhesive comprises a sorbitol epoxy, and a diepoxy wherein a portion of the diepoxy is a bisphenol-A based diepoxy compound and a portion is a glycol based diepoxy compound having an epoxy equivalent weight of at least about 250; and a second part of a combination of curing agents. In accordance with a further preferred aspect of the invention there is provided a hem-flange joint comprising a flange piece held in a hem piece by the adhesive of the invention.

The claimed invention has a surprising degree of humidity resistance, and high temperature strength, as well as the preferred cure properties necessary to allow the manufacture of large assemblies which are subjected to various conditions through the manufacturing process. The composition of the invention provides for a lower temperature induction cure processing which reduces or eliminates metal warpage during cure.

The claimed adhesive also provides improved toughness and flexibility which improves the ease of handling and adjusting of the assembled parts. Further, the claimed adhesive provides for a curing mechanism which will set and cross-link at room temperature, and through separate component parts provides for a nine to twelve month storage stability compared to two to three months for one part adhesives.

As the claimed invention is induction curable, there is no variation in cure time with changes in ambient conditions and will substantially fix component parts in place within 90 seconds given the proper temperature and fixture for curing.

In its most preferred mode, the adhesive of the invention may be utilized for bonding hem-flange assemblies in doors, hoods, deck lids, and lift gates as applied in the body shop prior to the cathodic electrode-coat primer bake. The adhesive of the invention is suitable for bonding zinc coated steels such as galvanized and galvannealed steel surfaces and additionally aluminum body panels. The adhesive of the invention cures at room temperature to a strength level sufficient to resist relative movement between inner and outer body panels and during normal body shop and paint shop handling.

Generally, the adhesive may be processed to full strength when the vehicle is subjected to the cathodic electrode-coat primer bake. The adhesive may be used on difficult to adhere substrates such as polymeric substrates, and organic substrates, metallic substrates including those metallic substrates which have been treated, oiled, greased and the like for ease in handling, prevention of corrosion, etc. The claimed adhesive exhibits good adhesion to metal surfaces coated with approved metal forming lubricants which guard against corrosion, abrasion, scratching, and the like. The composition of the invention may be used in any number of environments such as military, aerospace, automotive, train, air and water craft, as well as any other environment which is generally typified by layer industrial assemblies which may be subjected to high impact or vibration, temperature extremes, complex assemblies including assemblies of multiple components of varying composition.

In the context of the invention, polyfunctional means compounds, monomers, polymers and copolymers, etc. which comprise more than two functional groups of the same type.

DETAILED DESCRIPTION OF THE INVENTION

The invention is a two-part, heat or induction-curable, toughened epoxy adhesive system useful for bonding component parts. Generally, the adhesive system of the invention comprises a first part of polyfunctional epoxy and difunctional epoxy as well as a second part of curing agent and hardener.

EPOXY COMPOUNDS

Generally, the composition of the invention may comprise one or more epoxy compounds. Epoxy resins are generally characterized by a three membered ring known as the epoxy, epoxide, oxirane, or ethoxyline group typified by two carbon atoms bonded to each other which are also commonly joined to an oxygen atom to form a ring structure. Generally, epoxy resins contain aliphatic, cycloaliphatic, or aromatic backbones. The capability of the epoxy ring to react with a variety of substrates imparts versatility to the resins.

Within the context of the invention, the epoxy compounds generally function to provide flexibility to the bond as well as high temperature strength. Further, those epoxy compositions used in accordance with the invention, allow for a low temperature cure at a higher rate. Generally, any number of epoxy compounds which may provide these properties may be used in accordance with the invention. Preferably, the epoxy of the invention comprises a mixture of at least two types of epoxy composition, being polyfunctional epoxy compounds and diepoxy compounds.

A. Polyfunctional Epoxies

Generally one type of epoxy composition preferred for use in accordance with the invention is a polyfunctional epoxy composition comprising at least about three epoxide groups. The polyfunctional epoxide resins function to enhance cure performance by providing heightened curing at lower effective temperatures.

Generally, the polyfunctional epoxy compounds of the invention may be derived from any number of sources including the reaction product of chlorhydrin compounds such as epichlorohydrin, glycerol dichlorohydrin, and β-methylepichlorohydrin with polycarboxylic acid compounds including aromatic and aliphatic polycarboxylic acids such as tri and tetra carboxylic acids; with polyhydroxyl compounds such as alcoholic and phenolic polyhydroxyl compounds; with amine compounds comprising three or more amino hydrogen atoms including aliphatic, cycloaliphatic, and aromatic amines; with polythiol compounds; and with polyene type unsaturated cycloaliphatic compounds.

More preferably, polyfunctional epoxies may be derived from any number of sources including the reaction of various chlorhydrin derivatives such as epichlorohydrin, glycerol dichlorohydrin, or beta-methylephichlorohydrin with polyhydric alcohols. Various polyhydric alcohols may be used to form polyfunctional epoxies when reactive with the chlorohydrin derivatives in alkaline conditions. Polyhydric alcohols useful in this invention includes tetritols such as erythritol, threitol; pentitols such as ribitol, arabinitol, and xylitol; hexitols, such as allitol, dulcitol, glucitol, sorbitol, mannitol, altritol, iditol; as well as maltitol, and latitol, as examples.

Generally, the more desirable epoxy resins include those derived from saturated and unsaturated polyfunctional alcohols such as tetritols, pentitols, and hexitols such as sorbitol, and maltitol. One group of preferred polyfunctional epoxies are aliphatic epoxy resins of hexitol polyglycidyl ethers such as sorbitols and maltitols. Polyfunctional epoxy resins are available from suppliers such as Dow Chemical, Ciba Geigy, Rhone-Poulenc, Shell Chemical as well as from Dixie Chemical Company of Houston, Tex. which offers the sorbitol polyglycidyl ether as Dixie DCE 358.

We have found that these epoxies provide rapid cure, good adhesion, and impact resistance over time. Generally, the concentration of the polyfunctional epoxy resin may range from about 1 to 25 wt-%, preferably from about 3 to 20 wt-%, and most preferably from about 5 to 17 wt-% on the basis of the adhesive composition as a whole. Decreasing the concentration of the polyfunctional epoxy will result in poor curing performance while increasing the concentration of the polyfunctional epoxy will tend to decrease the humidity resistance of the adhesive as well as the overall flexibility of the resulting adhesive bond.

Difunctional Epoxies

The first part of the adhesive of the invention may also comprise one or more difunctional epoxies. These compounds generally provide an epoxy bond with high temperature strength and preferably a high degree of flexibility. Useful epoxy compounds include the reaction products of difunctional amines, aliphatic, cycloaliphatic and aromatic alcohols, carboxy compounds, diene compounds, and thiols among other compounds, with a chlorohydrin compound. Generally, diepoxide functional compounds useful in accordance with the invention include glycidyl ethers of alkyl, cycloalkyl, and aromatic difunctional alcohols such as butane diol, hexane diol ethylene glycol, hydrogenated diphenyl, diphenylol propane, and the like.

Also useful are diepoxy compounds resulting from dicarboxylic acids which have been reacted with epichlorohydrin, glycerol dichlorohydrin, or β-methylepichlorohydrin such as saturated aliphatic dicarboxylic acids, such as oxalic acid, malonic acid, succinic acid, α-methylsuccinic acid, glutaric acid, adipic acid, pimelic acid, azelaic acid, sebacic acid or dimerized linoleic acid; or unsaturated aliphatic dicarboxylic acids, such as maleic acid, mesaconic acid, citraconic acid, glutaconic acid or itaconic acid; or cycloaliphatic dicarboxylic acids, such as hexahydroterephthalic acid, or tetrahydrophthalic, tetrahydroisophthalic or tetrahydroterephthalic acid, or 4-methyltetrahydrophthalic acid, 4-methylhexahydrophthalic acid or endomethylenetetrahydrophthalic acid; or aromatic dicarboxylic acids, such as phthalic, isophthalic or terephthalic acid; or copolymers of methacrylic acid with styrene or with methyl methacrylate.

Generally, the concentration of the difunctional or diepoxy compounds may range from about 30 to 99 wt-%, preferably from about 35 to 80 wt-%, and most preferably from about 55 to 70 wt-%. Increasing the concentration of these difunctional epoxy compounds will generally decrease the humidity resistance of the adhesive bond as well as the cure performance of the composition. In contrast, decreasing the concentration of the constituents may decrease the flexibility and high temperature strength of the composition.

In its most preferred mode, the difunctional epoxy compound may comprise a diepoxy bisphenol-A compound as well as a glycol based diepoxy compound. Generally, the glycol based diepoxy may result from the reaction of a chlorohydrin compound with a difunctional alcohol such as ethylene glycol, diethylene glycol, propane-1, 2-diols, propane-1, 3-diols, poly (oxyethylene or oxypropylene) glycols, butane diols, polyoxybutylene glycols, pentanediols, neopentyl glycol, hexane diol, octane diol, decane diol, dodecane diol and mixtures thereof. Preferably the glycol-based epoxy has an epoxide equivalent weight of at least about 250, which will range from about 280 to 350 and most preferably from about 300 to 340.

In its most preferred mode the precured adhesive of the invention will comprise from about 25 to 75 wt-%, preferably from about 30 to 60 wt-%, and most preferably from about 35 to 45 wt-% diepoxy Bisphenol-A compound as a percentage of the entire adhesive composition to provide high temperature strength.

Further, the precured adhesive of the invention will comprise from about 1 to 25 wt-%, preferably from about 5 to 17 wt-%, and most preferably from about 8 to 15 wt-% glycol based epoxy compound having an epoxy equivalent weight of at least about 250, as a percentage of the entire adhesive composition to provide flexibility in the cured bond.

The Curing Agent

Generally, the composition of the invention may also comprise any number of curing agents. Curing agents generally precipitate a chemical reaction which leads to the formation of a chemical bond that can be used for the cross-linking of polymers, such as epoxies, in accordance with the invention. Generally, the curing agents used in accordance with the invention provide for bonds which have the preferred adhesion, flexibility, as well as humidity resistance and shear performance. Generally, any heat activateable curing agent for epoxy resins may be used in accordance with the invention.

Generally, epoxy resins may be cured with amines, amine terminated polyamines, amidoamines, acid catalysts, tertiaryamine catalysts, carboxylic acids, anhydrides, and phenols. Other curing agents which may be used with epoxy resins include polyamides, formaldehyde resins, and hydrates, aliphatic polyamines, aromatic polyamines, poly amines, polycarboxylic acid polyesters, Lewis acids and basis, polysulfides, and polymercaptans, phenolnovolac resins, and cycloaliphatic polyamines.

These curing agents include, for example, di- and polyfunctional hydroxy alkyl amines, such as di(aminoalkyl)ether of diethylene glycol; blocked amines such as mono-, di-, tri-, and tetra ethylene diamines; aromatic amines, such as bis-(4-aminophenyl)-methane, aniline-formaldehyde resins, bis-(4-aminophenyl) sulfone, bis-(4-aminophenyl)-methane or 2,2-bis-(4-aminophenyl)-propane; polyaminoamides, such as those formed from aliphatic polyamines and dimerized or trimerized fatty acids; or amides, including polyamide resins of amines reacted with fatty acids such as di-, tri-, and polyamines including for example, polyethylene polyamines, cycloaliphatic polyamines, and dimerized fatty acids resulting from, for example, $C_{(2-24)}$ carboxylic acids, and further including substituted ureas, particularly ureas having aromatic radicals, such as N-(4-chlorophenyl)-N',N'-dimethylurea, N-(2-hydroxyphenyl)-N',N'-dimethylurea or 2,4-bis-(N,N-dimethylureido)-toluene; or polyphenols, such as resorcinol, hydroquinon or 2,2-bis-(4-hydroxyphenyl)-propane (bisphenol-A) and novolacs based on monophenols or polyphenols, such as phenol or cresols, and aldehydes such as formaldehyde, acetaldehyde or chloral; or anhydrides of polycarboxylic acids, such as phthalic anhydride, tetrahydrophthalic anhydride, hexahydrophthalic anhydride, hexachloroendomethylene tetrahydrophthalic anhydride, pyromellitic anhydride or benzophenone-3,3',4, 4'-tetrecarboxylic dianhydride; or curing agents having a catalytic action, for example tertiary amines, for example 2,4,6-tris-(dimethylaminomethyl)-phenol; imidazoles for example 1-methylimidazole, 2-methylimidazole, 2-ethyl 4-methyl imidazole, 2-phenylimidazole, 1-benzyl-2-methylimidazole, 2-heptadecylimidazole, 2-(2-methyl imidazole-1-yl) ethyl azine, 2-phenyl 4, 5 dimethanolyl imidazole, 2-(2-methylimidazole-1-yl) ethyl azine triazine trione; or amidines, for example dicyandiamide or 1-cyano-3-(lower alkyl)-guanidines, for example the 3-methyl-, 3, 3-dimethyl- or 3,3-diethyl- derivatives.

Curing agents which are useful in accordance with the invention include imidazole-based curing agents that increases cure performance and drastically improve humidity resistance in the cured bond. One class of curing agents include imidazole-epoxy condensates which are useful in increasing humidity resistance. Generally, preferred condensates comprise monofunctional imidazole compounds with an amine hydrogen, including those referenced above, combined with any of the epoxy compounds previously mentioned in a ratio of about 2 to 1, respectively. In this application, the condensate is only partially reacted and acts as an epoxy polymerization catalyst. Condensates useful in this invention include those such as Shell EPON® P101. Also useful, if not preferable, are which increase flexibility and adhesion within the cured bond. This is especially relevant to the formation of a hem flange joint as one or more of the metal components may contain a drawing compound or machining oil which is resistant to adhesive permeation during manufacturing. The -di(aminoalkyl)ether of diethylene glycol (such as di(aminomethyl), di(aminoethyl), di(aminopropyl), and di(aminobutyl) ethers of diethylene glycol) curing agent assists the adhesive in permeating the machining oil to provide a secure bond of high structural integrity on the metal surface. To increase cure speed, imidazole curing agents may be used such as those available from Ajinamoto of Japan as its AH 300 imidazole curing agent. One of skill in the art will realize that any of the curing agents disclosed herein may be used in the epoxy part of the adhesive with shortened shelf life (three to six months).

Preferred curing agents also include -di(aminoalkyl)ether of diethylene glycol products from Dixie Chemical, BASF Co., and Dow Chemical Co. among others, and dicyandiamide products from American Cyanamide Company, Pacific Anchor Chemical Corporation (Amicure CG-1200), as well as various preferred Henkel Products such as Versamid® 140 which is a polyamide resin of polyethylene polyamines and $C_{18}$ unsaturated dimerized fatty acids.

The concentration of these curing agents may range from about 1 to 40 wt-%, preferably from about 6 to 24 wt-%, most preferably from about 9 to 16 wt-%.

We have found that by including a combination of curing agents into the adhesive of the invention, the resulting adhesive is fast curing at low temperature and provides a bond of sustained strength, adhesion and shear performance, humidity resistance and flexibility.

In its preferred mode the composition of the invention may comprise an epoxy/imidazole condensate at a concentration of about 1 to 40 wt-%, preferably about 10 to 30 wt-%, and more preferably about 16 to 24 wt-% of the second part of the adhesive to increase reactivity and humidity resistance. As a percentage of the entire adhesive composition, the condensate may comprise from about 1 to 10 wt-%, preferably about 2.5 to 7.5 wt-%, and more preferably about 4 to 6 wt-%. Further, the second part of the adhesive of the invention may comprise an imidazole curing agent at a concentration ranging from about 1 to 40 wt-%, preferably about 10 to 30 wt-%, and more preferably about 16 to 20 wt-% to increase reactivity. As a percentage of the entire adhesive composition the imidazole may range from about 1 to 10 wt-%, preferably about 2.5 to 7.5 wt-%, and more preferably from about 4 to 5 wt-%. The second part of the adhesive preferably also comprises from about 2 wt-% to 40 wt-%, preferably about 10 wt-% to 30 wt-%, and more preferably about 16 wt-% to 24 wt-% -di(aminoalkyl)ether of diethylene glycol to provide a bond of high structural strength and integrity. The entire adhesive may generally comprise about 1 wt-% to 10 wt-%, preferably about 2.5 wt-% to 7.5 wt-%, and more preferably about 4 wt-% to 6 wt-% -di(aminoalkyl)ether of diethylene glycol curing agent. The adhesive of the invention may also comprise an amide curing agent such as dicyandiamide at a concentration of about 0.5 wt-% to 8 wt-%, more preferably about 1 wt-% to 4 wt-% and most preferably about 1.5 wt-% to 3 wt-% of the entire adhesive. This amide curing agent may be used in either the first part of the adhesive or the second part of the adhesive to provide fast curing at the appropriate temperatures. In its most preferred mode, the adhesive of the invention (as a separate first epoxy component and a second curing agent component) may be shelf stable for an extended period of time, that is nine to twelve months.

The use of curing agents above these concentrations generally results in poor humidity resistance and high temperature strength while the failure to use adequate concentrations of curing agent may result in poor cure performance, impact resistance and poor flexibility.

TOUGHENING AGENT

The composition of the invention may also comprise an agent useful in providing characteristics of impact resistance and flexibility. Generally any number of agents may be used in accordance with the invention to provide toughness or impact resistance in the cured adhesive bond while also inhibiting cracking within the bond. The toughening agent should also be compatible with the adhesive composition and the curing mechanisms which occur during processing.

Generally, the toughening agent may comprise a thermoplastic compound or polymer, a thermosetting compound or polymer or a combination of a thermoplastic and thermosetting compound or polymer, all of which will be prereacted and not effect the cross-linking mechanisms of the adhesive.

Broad classes of useful thermoplastic polymers include vinyl polymers, polyesters, polyamides, polyimides, polyamideimide, polyethers, block polyamides-polyethers, block polyesters-polyethers, polycarbonates, polysulfones, polybis-imidazole, polybis-oxazole, polybisthiazole, and polyphenyl polymers.

Vinyl polymers useful with the adhesives of the invention include polyethylene, polypropylene, rubbery polymers and copolymers prepared from monomers including ethylene, propylene, styrene, acrylonitrile, butadiene, isoprene, and others, acrylic acid, methacrylic acid, methylacrylate, methylmethacrylate, vinyl acetate, hydroxy methylacrylate, hydroxy ethylmethacrylate, and other well known vinyl monomers. A further class of polymers useful in the adhesives of the invention include thermoplastic polyesters made from a di- or tricarboxylic acid in combination with a di- or trihydroxy compound.

Another class of polymers useful in the invention include urethane copolymers made from polyfunctional isocyanate compounds in combination with a reactive compound such as an amine, an acid, or a hydroxyl compound.

Rubbery block copolymers derived from monomers are also useful in the invention including styrene, acrylonitrile, butylene, isobutylene, isoprene, and others. Such polymeric and copolymeric compositions include butyl rubber, acrylonitrile-butadiene-styrene polymers, styrene-isoprene-styrene block copolymers, styrene-butadiene-styrene block copolymers, styrene-ethylene-butadiene-styrene block copolymers, and others.

Another particularly preferred class of monomers include the acrylic class made from monomers such as acrylic acid, methacrylic acid, methylacrylate, methylmethacrylate, hydroxyalkyl acrylate and hydroxyalkyl methacrylate which can be formed in combination with other vinyl monomers including ethylene, styrene, propylene, vinyl chloride and others. Also useful are polymeric toughening agents which may comprise a combination of any of the aforementioned classes of monomers and polymers in either a reacted or unreacted state. The molecular weight and crosslinking extent of these polymers are selected such that the polymer can be easily handled in a molten form with handleable viscosities in common hot melt adhesive formulating equipment. The monomers in any of these classes may be combined towards the formulation of other toughening agents.

Further preferred polymeric toughening agents which have both a rubbery phase and a thermoplastic phase are acrylic core-shell polymers wherein the core is an acrylic polymer having a glass transition temperature below about 0° C., such as polybutyl acrylate or polyisooctyl acrylate, and the shell is an acrylic polymer having a glass transition temperature above about 25° C., such as polymethylmethacrylate.

Generally, the most useful resins include a butylene rubber base combined with an acrylic or acrylate in the form of a copolymer. One preferred composition includes alkylmethyl acrylate-butylene rubber copolymers such as methyl methacrylate-butylene-styrene rubbers.

Overall preferred toughening agents include a styrene-butadiene copolymer, an acrylate-butadiene copolymer, a methacrylate-butadiene copolymer and mixtures thereof.

Toughening agents also useful, if not preferable, include those having a molecular weight ranging between about 10,000 and 1,000,000 such as Paraloid® products sold by Rohm & Haas such as Paraloid BTA753 which is an acrylic rubber which increases bond toughness and impact resistance, and Blendex brand resins including Blendex resins 311 and 336 as well as acrylic core-shell graft polymers which include "Acryloid" KM 323 and "Acryloid" KM 330 (Rohm and Haas Co.).

ADJUVANTS

The adhesive composition of the invention may also comprise any number of adjuvants including plasticizers, fillers, and dyes among other constituents. Fillers may include compositions such as calcium carbonate and hydrophobic fumed silica. Pigments and dyes include compositions such as titanium dioxide and acetylene or carbon black. Acetylene black may serve a dual function as a pigment and an absorbent filler depending on the compositional make-up. The adhesive of the invention may also comprise any number of constituents which provide enhanced physical strength, adhesion, or structural integrity.

FORMULATION AND CURING

Generally, the adhesive of the invention may be developed in two separate parts which are combined prior to induction curing. These two parts generally comprise epoxy and curing agent in the separate first and second parts, respectively. The toughening agent may be included in either part of the adhesive. However, by premixing the toughening agent with the various epoxy resins the toughening agent may be more easily solubilized.

The adhesive of the invention may be cured by any means known to those of skill in the art including induction curing, oven curing, heat curing, etc.

The following tables illustrate the general constituent concentrations in the first part, second part, and combined adhesive (before cure) of the invention. Generally the ratio of the first adhesive part to the second part will range about 1 part of the second adhesive part (curing agents) to 3.2 parts of the adhesive first part (thermoset) up to about 4.8 parts of the adhesive first part. The ratio is generally about 4 parts of the adhesive first part to about 1 part of the adhesive second part.

|  | preferred | more preferred | most preferred |
|---|---|---|---|
| FIRST PART CONSTITUENTS (wt-% based on first part only) | | | |
| polyfunctional epoxy | 1–25 | 3–20 | 5–17 |
| difunctional epoxy | 30–99 | 35–80 | 55–70 |
| toughening agent | 1–25 | 5–20 | 9–18 |
| SECOND PART CONSTITUENTS (wt-% based on second part only) | | | |
| curing agent | 5–95 | 30–80 | 55–70 |
| adjuvants | 5–95 | 20–70 | 30–45 |
| ADHESIVE BEFORE CURE (wt-%) (combined first part and second part) | | | |
| polyfunctional epoxy | 1–20 | 2–15 | 5–15 |
| difunctional epoxy | 25–75 | 30–60 | 40–55 |
| curing agents | 1–40 | 6–24 | 9–16 |
| toughening agent | 1–20 | 4–16 | 7–15 |
| adjuvants | 1–50 | 5–40 | 10–30 |
| PHYSICAL PROPERTIES | | | |
| Shear Adhesion | 1800–3000 psi | 2–2700 psi | 22–2600 psi |
| T-peel* | 20–50 lb/in | 30–45 lb/in | 35–42 lb/in |
| INDUCTION TEMPERATURE | <300° F. | 250–300° F. | 275–300° F. |
| INDUCTION TIME | 1–10 sec. | 3–8 sec. | 4–6 sec. |

| ADHESIVE OPEN TIME | |
|---|---|
| TEMPERATURE | TIME |
| @ 65° F. | 80 minutes |
| @ 77° F. | 60 minutes |
| @ 95° F. | 50 minutes |
| @ 100° F. | 30 minutes |

*on oily galvanized steel

WORKING EXAMPLES

The following working examples are provided to further illustrate the various characteristics and attributes of the invention. These working examples should not be construed as limiting but rather as merely illustrative of the invention.

Working Example 1 (wt-%)

In Example 1 two adhesive parts were formulated and then combined to test physical characteristics of one embodiment of the adhesive of the invention.

|  | Wt-% |
|---|---|
| PART 1A | |
| Bisphenol-A Epoxy Resin | 68.00 |
| Glycol-based Aliphatic Epoxy Resin (Epoxy Equivalent Wt. 305–335) | 10.00 |
| Styrene Copolymer (Paraloid BTA, from Rohm & Haas) | 12.00 |
| Dicyandiamide | 2.00 |
| Potassium Aluminum Silicate | 2.00 |
| Calcium Oxide | 2.50 |
| Talc | 3.00 |
| Hydrophobic Fumed Silica | 0.50 |
| PART 1B | |
| di(aminoalkyl)ether of diethylene glycol | 20.58 |
| EPON P-101 (powdered amine curing agent, from Shell) | 14.68 |
| Polyamide resin of polyamines and $C_{18}$ dimerized fatty acid (Versamid 140, Henkel) | 13.21 |
| Inorganic Filler | 39.65 |
| Talc | 4.40 |
| Calcium Oxide | 4.40 |
| Potassium Aluminum Silicate | 3.52 |
| Hydrophobic Fumed Silica | 1.76 |

Parts 1A and 1B were then combined at a ratio of 100 parts by weight Part 1A to 24 parts by weight Part 1B.

RESULTS

Provided below are the results for the adhesive of Example 1.

| | |
|---|---|
| Shear Strength at 77° F. | 2300 psi |
| T-peel Strength at 77° F. | 28 pli |
| Torsional Impact at 77° F. | >60 in-lb |
| Shear Strength at 225° F. | 650 psi |
| Induction Cure (275 F./325° F., 5 sec.) | 1100 psi |

Failure mode for the composition of Working Example 1 was cohesive.

Working Example 2

Another adhesive was formulated in two parts, (Parts 2A and 2B), for testing in accordance with the invention.

|  | Wt-% |
|---|---|
| PART 2A | |
| Glycol-based Aliphatic epoxy resin (Epoxy Equivalent Wt. 305–335) | 15.56 |
| Sorbitol glycidyl ether epoxy resin | 10.50 |
| Bisphenol-A epoxy resin | 48.24 |
| Styrene-Butadiene Copolymers | 11.80 |
| Dicyandiamide | 1.60 |
| Potassium Aluminum Silicate | 1.00 |
| Calcium Oxide | 2.50 |
| Calcium Carbonate | 2.00 |
| Titanium Dioxide | 0.30 |
| Inorganic filler | 5.50 |
| Hydrophobic Fumed Silica | 1.00 |
| PART 2B | |
| di(aminoalkyl)ether of diethylene glycol | 26.00 |
| Powdered Amine Curing Agent (Shell EPON 101) | 19.50 |
| Polyamide resin of polyamines and dimerized fatty acid (Versamid 140, Henkel) | 19.50 |
| Calcium Oxide | 2.00 |
| Potassium Aluminum Silicate | 2.00 |
| Calcium Carbonate | 8.00 |
| Acetylene Black | 0.20 |
| Inorganic Filler | 14.80 |
| Hydrophobic Fumed Silica | 3.00 |

RESULTS

Viscosity measurements were then taken of separate components 2A and 2B to determine shelf stability.

| VISCOSITY | PART 2A | PART 2B |
|---|---|---|
| Initial (77° F.) | 36 sec. | 27 sec. |
| Aged 2 weeks @ R.T. | 31 sec. | 22 sec. |
| Aged 2 weeks @ 95° F. | 32 sec. | 24 sec. |
| Aged 5 weeks @ R.T. | 35 sec. | 26 sec. |
| Aged 5 weeks @ 95° F. | 34 sec. | 27 sec. |

Working Example 3

Parts 3A and 3B were formulated separately. Once formulated Parts 3A and 3B were combined with parts 2A and 2B; (earlier formulated), to evaluate shear strength. An evaluation of the adhesive of the invention was then undertaken to determine the possible reduction in shear strength after 500 hour in 100% humidity.

|  | Wt-% |
|---|---|
| PART 3A | |
| Bisphenol-A epoxy resin | 62.24 |
| Glycol-based epoxy resin (Epoxy Equivalent Wt. 305–335) | 1.56 |
| Sorbitol Glycidyl ether Polyfunctional Epoxy Resin | 10.50 |
| Styrene Copolymer | 11.80 |
| Polyamide Resin of Polyamines and Dimerized Fatty Acids (Versamid 140, Henker) | 1.60 |
| Potassium Aluminum Silicate | 1.00 |
| Calcium Oxide | 2.50 |
| Calcium Carbonate | 2.00 |
| Titanium Dioxide | 0.30 |
| Inorganic Filler | 5.50 |
| Hydrophobic Fumed Silica | 1.00 |
| PART 3B | |
| Aliphatic di(aminoalkyl)ether of diethylene glycol | 32.5 |
| Curing Agent (Shell EPON ® 101) | 0 |
| Dicyandiamide | 32.5 |
| Calcium Oxide | 7.0 |
| Potassium Aluminum Silicate | 2.0 |
| Calcium Carbonate | 8.0 |
| Acetylene Black | 0.2 |
| Inorganic Filler | 14.8 |
| Fumed Silica | 3.0 |

Once formulated Parts 3A and 3B were combined to evaluate shear strength.

| FORMULATION | |
|---|---|
| 3A | 100 PARTS/PART 3A |
|  | 29 PARTS/PART 2B |
| 3B | 100 PARTS/PART 2A |
|  | 43 PARTS/PART 3B |
| 3C | 100 PARTS/PART 2A |
|  | 27 PARTS/PART 2B |

Lap Shears were prepared with the above formulations, and cured using schedule of 4 hours at 72° F., 20 minutes at 325° F., 30 min. at 250° F. The cured constructions were then soaked in a 150° F. water for 7 days and then tested for lap shear strength.

| LAP SHEARS (lbs/in.) | | | |
|---|---|---|---|
| Formulations | Control* | Shear after 7 days | % Reduction |
| 3A | 2468 | 1869 | 24% |
| 3B | 2588 | 0 | 100% |
| 3C | 2587 | 1918 | 26% |

*No H₂O soak

Working Example 4

Evaluations were then under taken to compare the relative adhesive efficacy of components in PARTS 2A and 2B to determine their effect on physical properties when used in various combinations.

| | (Wt-%) | | |
|---|---|---|---|
| | PART 4A | PART 4B | PART 4C |
| Bisphenol-A epoxy resin | 57.10 | 11.00 | 17.00 |
| Glycol-based epoxy resin (Epoxy Equivalent Wt. 305–335) | 14.00 | 14.00 | 14.00 |
| Premix I* | — | 50.60 | 50.60 |
| Sorbitol Glycidyl Ether epoxy resin | 10.50 | 10.50 | — |
| Premix II** | 4.50 | — | 4.50 |
| Dicyandiamide | 1.60 | 1.60 | 1.60 |
| Potassium Aluminum Silicate | 1.00 | 1.00 | 1.00 |
| Calcium Oxide | 2.50 | 2.50 | 2.50 |
| Calcium Carbonate | 2.00 | 2.00 | 2.00 |
| Titanium Dioxide | 0.30 | 0.30 | 0.30 |
| Inorganic Filler | 5.50 | 5.50 | 5.50 |
| Hydrophobic Fumed Silica | 1.00 | 1.00 | 1.00 |

*Premix of 80% Bisphenol-A-Epoxy Resin (Dow DER-331) and 20% Styrene Copolymer (Rohm & Haas, Paraloid BTA 753).
**Premix of 27.9% Bisphenol-A-Epoxy Resin (Dow DER-331), 34.78% Glycol-based Epoxy Resin, Epoxy Eq. Wt. 305–335, (Dow DER-732); 37.3% Styrene-Butadiene Copolymer, (9.38% Blendex 311 and 27.92% Blendex 336 both from Borg Warner).

| PART 4D | Wt-% |
|---|---|
| EPON P-101 (Curing Agent, from Shell Chemical Co.) | 19.50 |
| Polyamide resin of polyamines and dimerized fatty acid (Versamid 140, Henkel) | 45.50 |
| Calcium Oxide | 7.00 |
| Potassium Aluminum Silicate | 2.00 |
| Calcium Carbonate | 8.00 |
| Acetylene Black | 0.20 |
| Inorganic Filler | 14.80 |
| Hydrophobic Fumed Silica | 3.00 |

| FORMULATION | |
|---|---|
| 4A | 100 PARTS/PART 4A |
|  | 27 PARTS/PART 2B |
| 4B | 100 PARTS/PART 4B |
|  | 27 PARTS/PART 2B |
| 4C | 100 PARTS/PART 4C |
|  | 27 PARTS/PART 2B |
| 4D | 100 PARTS/PART 2A |
|  | 27 PARTS/PART 4D |

| | FORMULATION | | | |
|---|---|---|---|---|
| FORMULATION | 4A | 4B | 4C | 4D |
| Shear strength* | 2572 psi | 2573 psi | 2519 psi | 2439 psi |
| T-peel | 23 pli | 30 pli | 34.5 pli | 22.4 pli |
| Torsional Impact* | >60 in lb | >60 in lb | >60 in lb | >60 in lb |

*(at ROOM TEMPERATURE)

Working Example 5

Induction cure studies were then undertaken on Formulations 3C, 4C and 4D as well as Formulation 4E which comprised 100 parts by weight Part 4C and 27 parts by weight Part 4D. Samples were prepared using galvanized steel, 10 mil bondline, tested 2 minutes after induction cure.

| | FORMULATION | | | |
|---|---|---|---|---|
| Cure Temperature | 4D | 3C | 4E | 4C |
| 275–300° F. | 113 psi | 120 psi | 8 psi | 75 psi |
| 250–275° F. | 5 psi | 10 psi | 2 psi | 5 psi |
| 325–350° F. | 584 psi | 564 psi | 908 psi | 500 psi |
| 300–325° F. | 216 psi | 200 psi | 108 psi | 270 psi |

Working Example 5

A further adhesive was formulated in two parts in accordance with the invention.

| | WT-% |
|---|---|
| PART 5A | |
| DER 331* | 36.70 |
| DER 732* | 11.10 |
| Premix II* | 6.90 |
| Premix I* | 12.50 |
| Calcium Oxide | 5.50 |
| Mica | 2.00 |
| Aerosil | 2.50 |
| Dicyandiamide | 3.10 |
| Inorganic Filler | 14.80 |
| Calcium Carbonate | 4.90 |
| PART 5B | |
| DCA 221 (Aliphatic di(aminoalkyl)ether of diethylene glycol Dixie Chemical) | 21.20 |
| EPON P-101 (Shell Chemical) | 15.90 |
| Versamid 140 (Henkel Inc.) | 15.90 |
| Calcium Oxide | 5.70 |
| Mica | 1.60 |
| Calcium Carbonate | 6.50 |
| Carbon Block | 0.20 |

-continued

| | WT-% |
|---|---|
| Inorganic Filler | 12.00 |
| Hydrophobic Fumed Silica | 2.50 |
| Imidazole Curing Agent (AJICURE AH-300, Ajinamoto of Japan) | 18.50 |

*See Working Example 4

Parts 5A and 5B were then intermixed at a ratio of 100 parts 5A to 27 parts 5B to provide the final adhesive.

Working Example 6

An analysis of the corrosion resistance of an adhesive formulated from Parts 2A and 2B was then undertaken, (100 pbw Part 2A, 27 pbw Part 2B).

Samples were prepared according to Working Example 2 and exposed to 500 hrs salt spray. Samples were given 24 hour recovery time, after which they were broken apart using a hammer and screwdriver. No rusting was evident when the adhesive seal was broken and the internal bond was examined. The adhesive was tested on both galvanized and galvannealled metal and failed cohesively when broken.

The above specification, examples and data provide a complete description of the manufacture and use of the composition of the invention. Since many embodiments of the invention can be made without departing from the spirit and scope of the invention, the invention resides in the claims hereinafter appended.

We claim as our invention:

1. An adhesive composition comprising:
    (a) a first part comprising;
        (i) about 1 to 25 wt-% of a polyfunctional epoxy compound having three or more epoxide groups,
        (ii) about 30–80 wt-% of one or more diepoxy compounds,
        (iii) about 1–25 wt-% of a toughening agent, and
    (b) a second part comprising about 5–95 wt-% of a curing agent, said curing agent comprising about 2–40 wt-% of a di(aminoalkyl)ether of diethylene glycol wherein the ratio of the second part to the first part is from about 1 part: 3.2 parts to 1 part: 4.8 parts by weight.

2. The composition of claim 1 wherein said polyfunctional epoxy comprises an hexitol polyglycidyl ether selected from the group consisting of a sorbitol polyglycidyl ether, a maltitol polyglycidyl ether, and mixtures thereof.

3. The composition of claim 1, wherein said diepoxy compound comprises diepoxy bisphenol-A.

4. The composition of claim 1 wherein said diepoxy compound comprises a blend of diepoxy bisphenol-A and a glycol-based diepoxy compound having an epoxide equivalent weight of at least about 250.

5. The composition of claim 1 wherein said curing agent further comprises an imidazole.

6. The composition of claim 1 wherein said toughening agent comprises one or more polymers selected from the group consisting of a styrene-butadiene copolymer, an acrylate-butadiene copolymer, a methacrylate-butadiene copolymer, and mixtures thereof.

7. The mixed adhesive resulting from the composition of claim 1.

8. The composition of claim 1 comprising from about 2 wt-% to 20 wt-% toughening agent.

9. A two-part induction-curable epoxy adhesive comprising a toughening agent:
    (a) a first part comprising;
        (i) from about 1 to 25 wt-% sorbitol polyglycidyl ether,
        (ii) from about 30 to 99 wt-% diepoxy bisphenol-A wherein at least 5 wt-% of said diepoxy bisphenol-A comprises a diepoxide/bisphenol-A having an epoxy equivalent weight ranging from about 300 to 340; and
    (b) a second part comprising:
        (i) from about 2 to 30 wt-% imidazole curing agent, and
        (ii) from about 2 wt-% to about 40 wt-% di(aminoalkyl)ether of diethylene glycol wherein the ratio of the second part to the first part is from about 1 part: 3.2 parts to 1 part: 4.8 parts by weight.

10. The mixed adhesive resulting from the composition of claim 9.

* * * * *

UNITED STATES PATENT AND TRADEMARK OFFICE
CERTIFICATE OF CORRECTION

PATENT NO. : 5,548,026

DATED : August 20, 1996

INVENTOR(S) : Jorissen et al.

It is certified that error appears in the above-identified patent and that said Letters Patent is hereby corrected as shown below:

```
Item [57], Abstract, line 9, please insert --including a--
after the word "compounds"

On column 7, line 24, please insert --di-(amionalkyl)ether of
diethylene glycol-- after the word "are"
```

Signed and Sealed this

Thirty-first Day of December, 1996

Attest:

BRUCE LEHMAN

Attesting Officer     Commissioner of Patents and Trademarks